United States Patent
Yamada et al.

(10) Patent No.: US 8,719,902 B2
(45) Date of Patent: May 6, 2014

(54) SECURE COMMUNICATION DEVICE, SECURE COMMUNICATION METHOD, AND PROGRAM

(75) Inventors: Kazushige Yamada, Kanagawa (JP); Satoshi Senga, Kanagawa (JP)

(73) Assignee: Panasonic Corporation, Osaka (JP)

( * ) Notice: Subject to any disclaimer, the term of this patent is extended or adjusted under 35 U.S.C. 154(b) by 296 days.

(21) Appl. No.: 13/060,791

(22) PCT Filed: Aug. 28, 2009

(86) PCT No.: PCT/JP2009/004239
§ 371 (c)(1),
(2), (4) Date: Feb. 25, 2011

(87) PCT Pub. No.: WO2010/023951
PCT Pub. Date: Mar. 4, 2010

(65) Prior Publication Data
US 2011/0162044 A1 Jun. 30, 2011

(30) Foreign Application Priority Data
Aug. 29, 2008 (JP) ................................. 2008-222554

(51) Int. Cl.
*G06F 17/00* (2006.01)
*H04L 29/06* (2006.01)
*G06F 7/04* (2006.01)
*G06F 15/16* (2006.01)
*G06F 17/30* (2006.01)

(52) U.S. Cl.
USPC .................................................. 726/3; 726/1

(58) Field of Classification Search
USPC ........................................................ 726/1, 3
See application file for complete search history.

(56) References Cited

U.S. PATENT DOCUMENTS

| 4,771,458 | A | * | 9/1988 | Citta et al. ..................... 380/239 |
| 6,253,321 | B1 | | 6/2001 | Nikander et al. |
| 6,983,366 | B1 | | 1/2006 | Huynh et al. |
| 7,895,431 | B2 | | 2/2011 | Bouchard et al. |
| 2002/0105956 | A1 | | 8/2002 | Saito |
| 2006/0056406 | A1 | | 3/2006 | Bouchard et al. |
| 2007/0038798 | A1 | | 2/2007 | Bouchard et al. |

(Continued)

FOREIGN PATENT DOCUMENTS

| EP | 2 051 434 A1 | 4/2009 |
| JP | 2002-164924 A | 6/2002 |

(Continued)

OTHER PUBLICATIONS

Request for Comments: 1122 Requirements for Internet Hosts—Communication Layers Oct. 1989.*

(Continued)

*Primary Examiner* — Kambiz Zand
*Assistant Examiner* — Benjamin Kaplan
(74) *Attorney, Agent, or Firm* — Greenblum & Bernstein, P.L.C.

(57) ABSTRACT

A secure communication device for high-speed encryption/decryption authentication including network stack processing. An encryption/decryption authentication controller of the secure communication device acquires the result of processing of the encrypted/decrypted or authenticated previous packet from an encryption/decryption authenticator and controls a network protocol processor so that the second half of the processing of the network protocols of the previous packet and the first half of the processing of the network protocols of the current packet are continuously performed.

14 Claims, 13 Drawing Sheets

(56) References Cited

U.S. PATENT DOCUMENTS

2008/0253566 A1* 10/2008 Hidaka .................. 380/255
2010/0077226 A1   3/2010 Senga et al.
2010/0153705 A1   6/2010 Senga et al.

FOREIGN PATENT DOCUMENTS

| | | |
|---|---|---|
| JP | 2002-217951 A | 8/2002 |
| JP | 2002-524891 A | 8/2002 |
| JP | 2005-503699 A | 2/2005 |
| JP | 2008-48042 A | 2/2008 |
| JP | 2008-512950 A | 4/2008 |
| JP | 2008-310270 A | 12/2008 |
| WO | 03/021443 A | 3/2003 |

OTHER PUBLICATIONS

Request for Comments: 1123 Requirements for Internet Hosts—Application and Support Oct. 1989.*

* cited by examiner

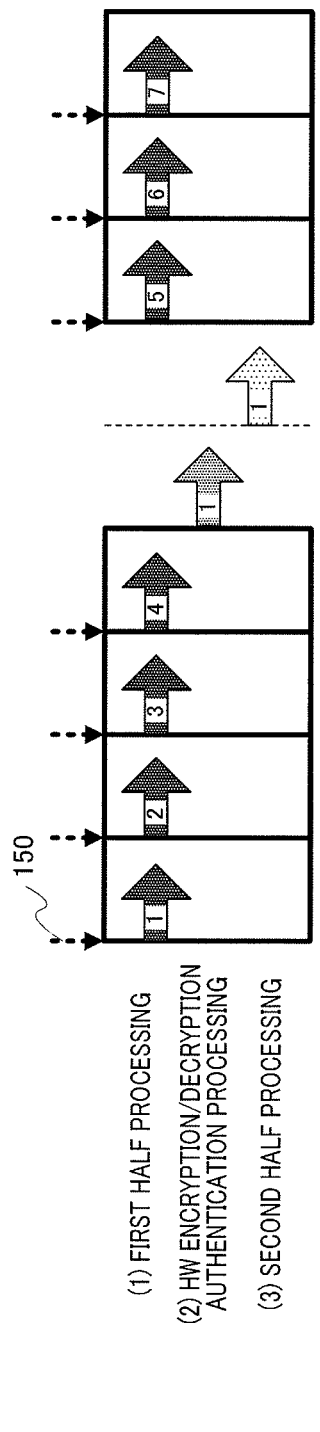
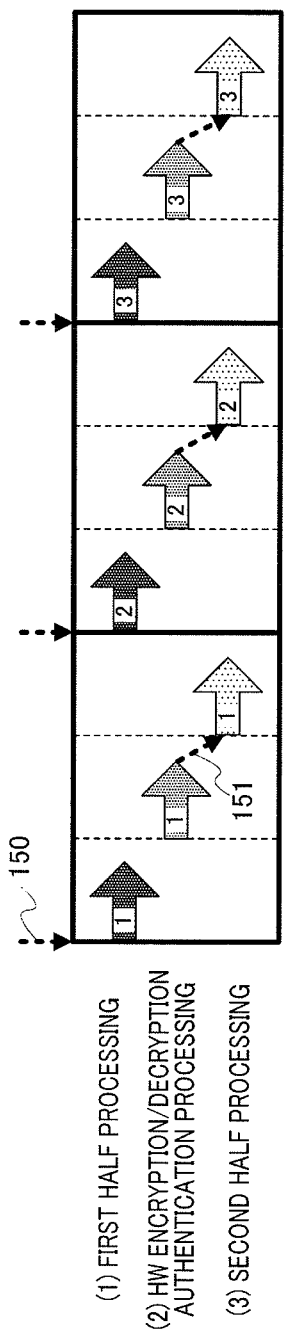
FIG.5a
FIG.5b

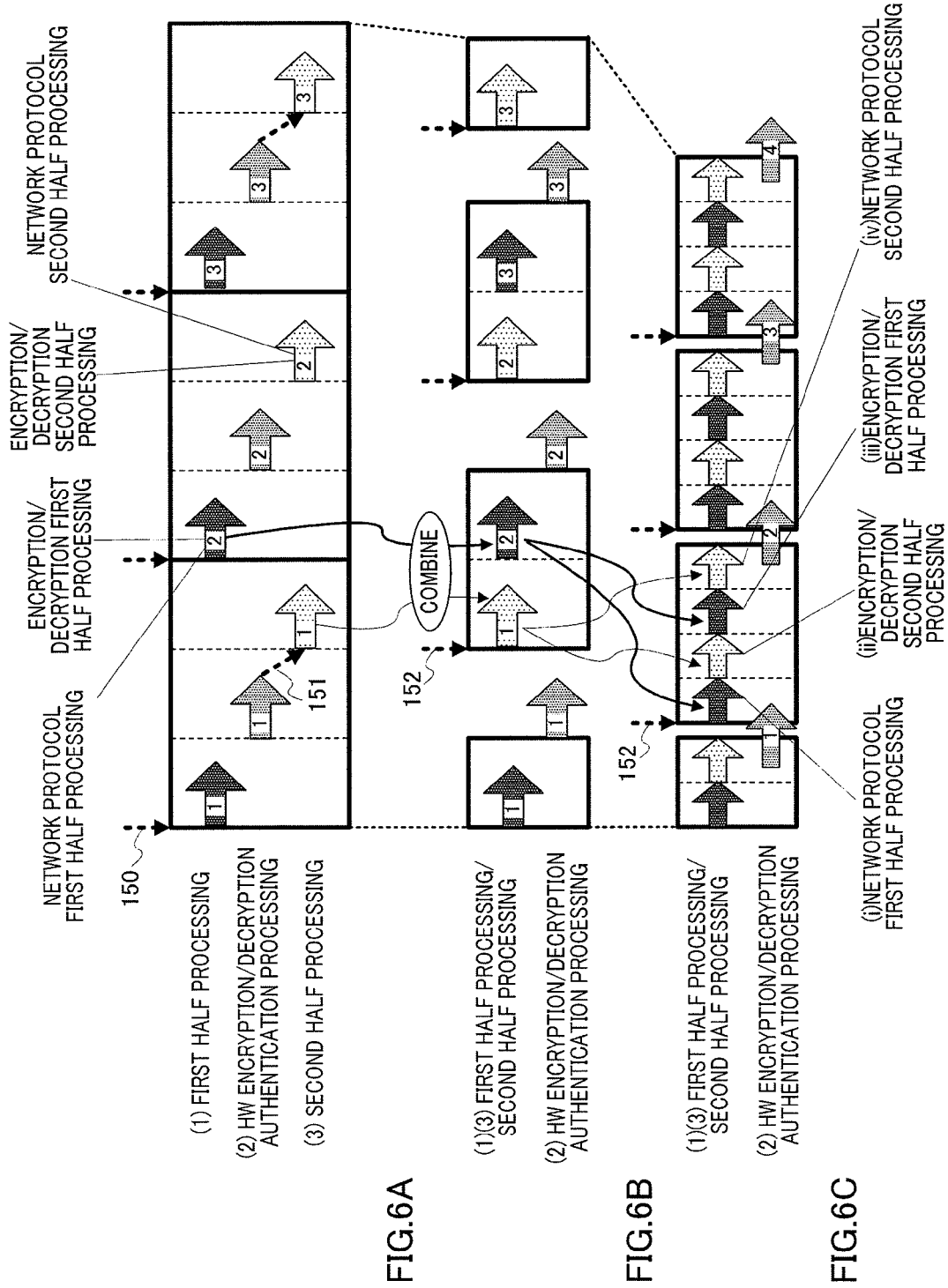

US 8,719,902 B2

SECURE COMMUNICATION DEVICE, SECURE COMMUNICATION METHOD, AND PROGRAM

TECHNICAL FIELD

The present invention relates to a secure communication apparatus, a secure communication method and a program.

BACKGROUND ART

IP secure communication is a general means for encrypting information that flows on a network. In IPv6, IPsec for performing encrypted communication is standardized as a default function, by an RFC (Request For Comment).

To perform IP secure communication, encryption/decryption authentication processing to involve high-load processing, needs to be performed on a real-time basis. Consequently, when IP secure communication requires specially high speed in, for example, servers or routers, or when IP secure communication is implemented using less powerful machines such as embedded devices, cases might occur where IP secure communication is implemented using special hardware (hereinafter "HW engine") for performing encryption authentication processing (see patent literature 1). Hereinafter "hardware" may be abbreviated to simply as "HW."

Generally, to perform encryption/decryption authentication processing using a HW engine, pre-processing such as setting up the HW engine and post-processing for collecting calculation results from the HW engine, need to be performed using software. Consequently, generally, unless post-processing for the first packet is finished first, pre-processing for a second packet cannot be started.

Patent literature 2 proposes a method of providing an encryption/decryption unit and a plurality of authentication units in an encryption/decryption authentication engine, so that, by operating these units through pipeline processing, pre-processing for a second packet can be started at the time processing for the first packet is finished in the encryption/decryption unit or the authentication units.

FIG. 1 explains communication stack processing when HW encryption authentication is performed, where FIG. 1A illustrates normal communication stack processing and FIG. 1B illustrates communication stack processing when HW encryption authentication is performed.

In FIG. 1, secure communication apparatus 10 is configured with communication stack section 11 that executes layer processing 1 and layer processing 2, buffer 12 that stores received/transmitting information on a temporary basis, and encryption authentication processing section 13 that issues a HW processing request to a HW engine and executes encryption authentication processing.

As shown in FIG. 1A, in normal communication stack processing, communication stack section 11 executes layer processing 1 and layer processing 2 via buffer 12 by means of a transmission command or a reception interrupt.

As shown in FIG. 1B, in the event HW encryption authentication is performed, communication stack section 11, upon receiving a transmission command or a reception interrupt, commands processing to encryption authentication processing section 131 in layer processing 1, and encryption authentication processing section 13 issues a HW processing request to encryption/decryption authentication processing section 14 to be described later (see FIG. 2). HW encryption/decryption authentication processing section 14 (see FIG. 2) receives this HW processing request, performs encryption/decryption authentication processing by means of HW and returns delay processing for completing encryption authentication processing, to communication stack section 11, via encryption authentication processing section 13. Communication stack section 11 receives the encryption authentication processing result in encryption authentication processing section 13, and executes layer processing 2 via buffer 12.

In the event encryption/decryption authentication processing by means of HW encryption/decryption authentication processing section 14 (see FIG. 2) is performed while transmission/reception processing by means of layer processing 1 and layer processing 2 is in progress, communication stack section 11 performs the first half processing and the second half processing asynchronously. By performing the first half processing and the second half processing asynchronously, communication stack section 11 is able to improve the efficiency of use of HW encryption/decryption authentication processing section 14 (see FIG. 2) and network devices (not shown).

FIG. 2 shows a detailed configuration of encryption authentication processing section 13. FIG. 3 is a timing chart showing operating timings of encryption authentication processing section 13 and HW encryption/decryption authentication processing section 14. In FIG. 2 and FIG. 3, the numbers (1) to (7) are codes for explaining the process flow.

In FIG. 2, secure communication apparatus 10 is configured with communication stack section 11, encryption authentication processing section 13, and HW encryption/decryption authentication processing section 14 that executes encryption/decryption authentication processing by means of a HW engine. Furthermore, encryption authentication processing section 13 includes request control section 21, HW pre-processing section 22, HW post-processing section 23, and queue 24.

When encryption authentication processing is commanded from layer processing 1 of communication stack section 11, request control section 21 stacks this request in queue 24 (see (1)). When HW is not busy, request control section 21 commands HW pre-processing to HW pre-processing section 22 (see (2)).

HW pre-processing section 22 acquires a request from queue 24 (see (3)), and issues a processing request to HW encryption/decryption authentication processing section 14 according to the acquired request (see (4)).

HW encryption/decryption authentication processing section 14 performs encryption/decryption authentication processing by HW according to HW processing request from encryption authentication processing section 13. When the encryption/decryption authentication processing in response to the HW processing request is finished, HW encryption/decryption authentication processing section 14 issues a HW interrupt signal (see FIG. 3) and outputs a delay processing start command based on this HW interrupt signal to HW post-processing section 23 (see (5)).

Encryption authentication processing section 13, upon receiving a delay processing start command from HW encryption/decryption authentication processing section 14, starts HW post-processing. As shown in FIG. 3, from the perspective of layer processing 1, the period of time after HW pre-processing section 22 finishes HW pre-processing, until HW post-processing section 23 starts HW post-processing, becomes a period of time in which HW post-processing section 23 cannot perform HW post-processing. Encryption authentication processing section 13 acquires a HW processing result from HW encryption/decryption authentication processing section 14 (see (6)) and executes HW post-processing. Encryption authentication processing section 13, upon finishing HW post-processing, commands the second half processing to layer processing 2. Encryption authentication processing section 13 executes layer processing 2. By this means, as shown in FIG. 3, encryption authentication processing in response to a request received from queue 24 is finished, and the next HW pre-processing is executed in the same way

CITATION LIST

Patent Literature

PTL 1
Published Japanese Translation No. 2005-503699 of the PCT International Publication
PTL 2
U.S. Pat. No. 6,983,366 Specification

SUMMARY OF INVENTION

Technical Problem

However, with a conventional HW encryption authentication method such as this, although the efficiency of use of HW encryption/decryption authentication processing section 14 and network devices can be improved by performing the first half processing and the second half processing asynchronously in communication stack section 11, network stack processing that needs to be performed before pre-processing (hereinafter "stack first half processing") and network stack processing that needs to be performed after post-processing (hereinafter "stack second half processing") are disrupted by encryption/decryption authentication processing (including pre-processing, HW engine processing and post-processing), and therefore two processing are executed in a discontinuous manner.

When two processing are executed in a discontinuous manner, if packets are received in a burst fashion, only the stack first half processing of the higher priority continues being executed, and the second half processing cannot be started. This raises a problem of uneven distribution of load in the CPU or HW engine, and, as a result, the throughput of packet transmission decreases.

Furthermore, a software delay interrupt for executing post-processing and stack second half processing needs to be woken up, and this also raises a problem of producing extra overhead.

For example, as shown in FIG. 2 and FIG. 3, in IPSec processing by means of HW, context is disrupted between layer processing 1 and layer processing 2. Consequently, when the context of layer processing 1 is finished, there is a gap until the context of layer processing 2 starts, and so a decrease in performance occurs. Furthermore, as shown in FIG. 3, a request for the next packet cannot be transmitted until HW post-processing section 23 is started by a delay processing start command (see (5)), and this, again, raises problems of decreased efficiency of use of HW encryption/decryption authentication processing section 14, decreased performance and queue overflow.

The present invention is made in view of the above and aims to provide a secure communication apparatus, a secure communication method and a program, whereby encryption/decryption authentication processing by which CPU and HW engine load is less likely to be distributed unevenly can be performed, without overhead by disrupting processing, and whereby high speed encryption/decryption authentication processing including network stack processing can be performed.

Solution to Problem

A secure communication apparatus according to the present invention employs a configuration having: a communication section that transmits and receives a communication packet; a network protocol processing section that performs network protocol first half processing and second half processing; an encryption/decryption authentication processing section that performs encryption/decryption processing or authentication processing; and an encryption/decryption authentication processing control section that acquires a processing result of a packet for which encryption/decryption processing or authentication processing has been finished, from the encryption/decryption authentication processing section, and controls the network protocol processing section to perform the network protocol second half processing of the packet and the network protocol first half processing of a next packet.

An encrypted information communication method according to the present invention includes: a step of transmitting and receiving a communication packet; a network protocol processing step of performing network protocol first half processing and second half processing; an encryption/decryption authentication processing step of performing an encryption/decryption processing or authentication processing; and a control step of performing control to acquire a processing result of a packet for which the encryption/decryption processing or authentication processing has been finished, and performing network protocol second half processing of the packet and the network protocol first half processing of a next packet in a continuous manner.

Furthermore, from another aspect, the present invention provides a program for making a computer execute the steps of the above secure communication method.

Advantageous Effects of Invention

With the present invention, processings up to upper layers are executed by the same context, so that, without producing overhead by disrupting processing, it is possible to perform encryption/decryption processing and authentication processing whereby CPU and HW engine load is less likely to be distributed unevenly, and speed up encryption/decryption processing and authentication processing in secure communication including network protocol processing.

BRIEF DESCRIPTION OF DRAWINGS

FIG. 5 shows equalization of load, explaining the basic concept of the present invention;

FIG. 6 shows a high-speed control scheme using load equalization, explaining the basic concept of the present invention;

DESCRIPTION OF EMBODIMENTS

Embodiments of the present invention will be described below in detail with reference to the accompanying drawings.

(Explanation of Basic Principles)

The basic idea of the present invention will be described first.

Figure 4:
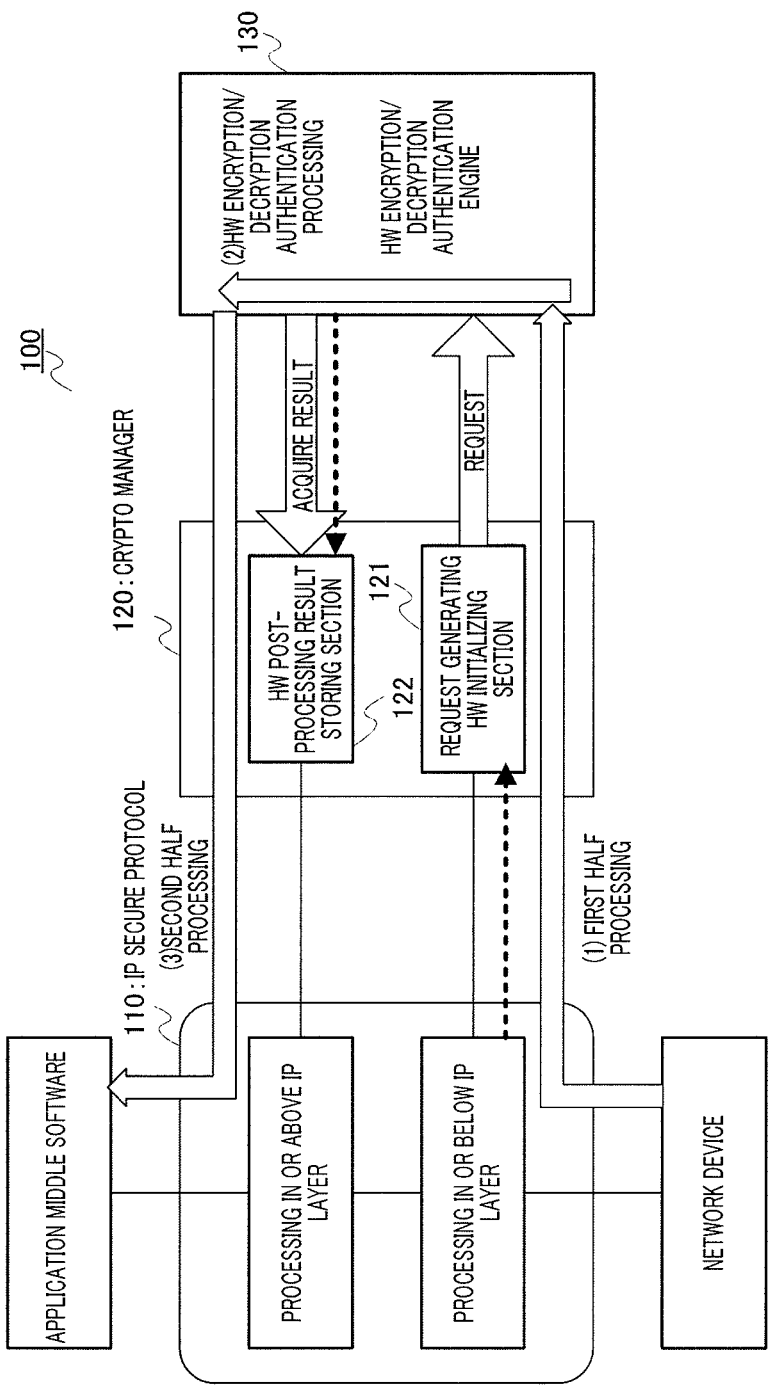
FIG. 4 is an overview for explaining the basic concept of the present invention, drawn on a protocol level.

FIG. 4 through FIG. 6 explain the basic idea of the present invention, where FIG. 4 shows an overview drawn on a protocol level, FIG. 5 shows equalization of load, and FIG. 6 shows a high-speed control method using equalization of load.

In FIG. 4, secure communication apparatus 100 is configured with IP secure protocol 110, crypto manager 120, and HW encryption/decryption authentication engine 130.

IP secure protocol 110 performs processing in or above the IP layer for executing application/middle software (layer processing 1, for example), and processing in or below the IP layer connected to network devices (layer processing 2, for example).

Figure 1:
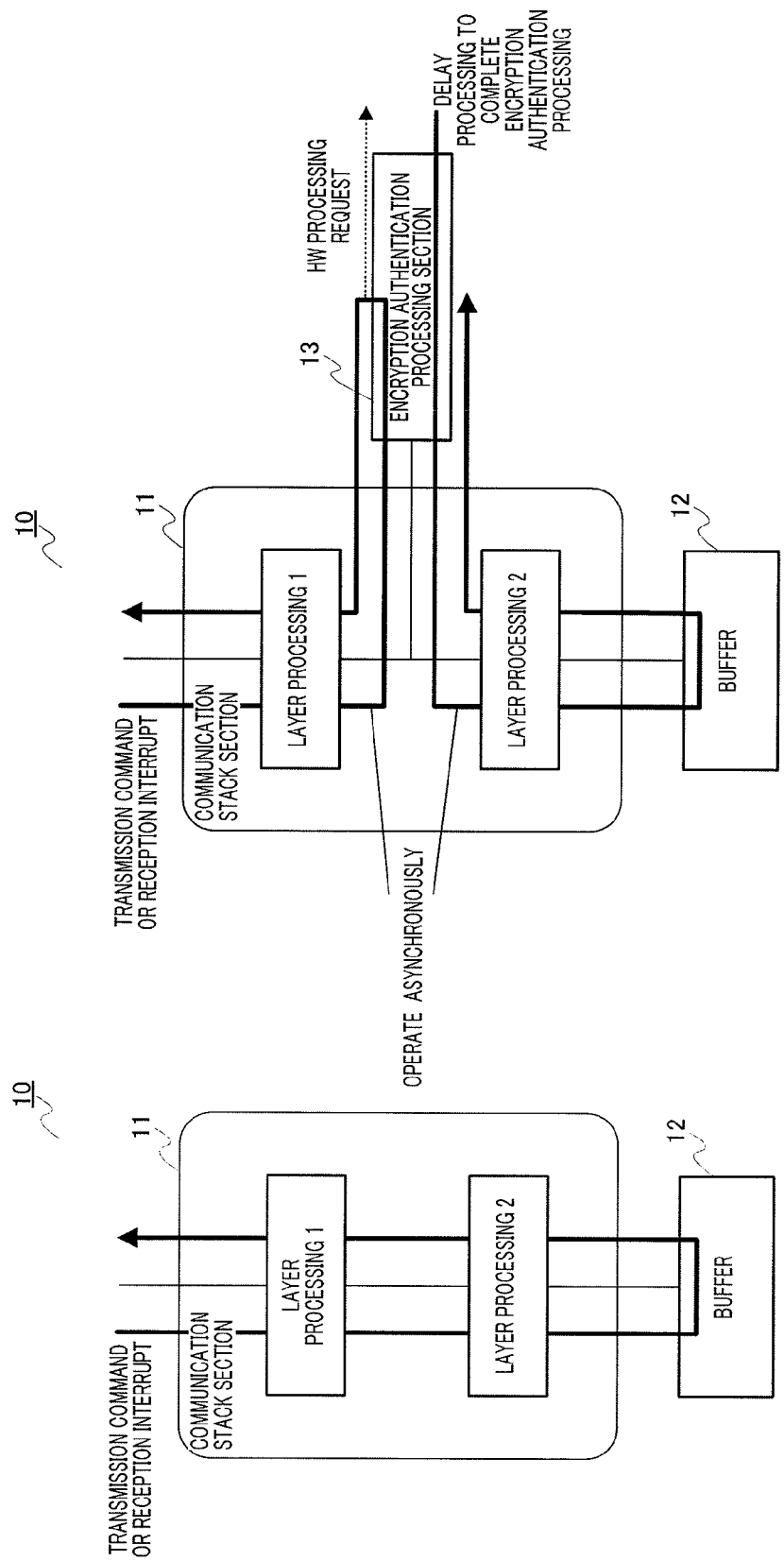
FIG. 1 explains communication stack processing when conventional HW encryption authentication is performed.
Figure 2:
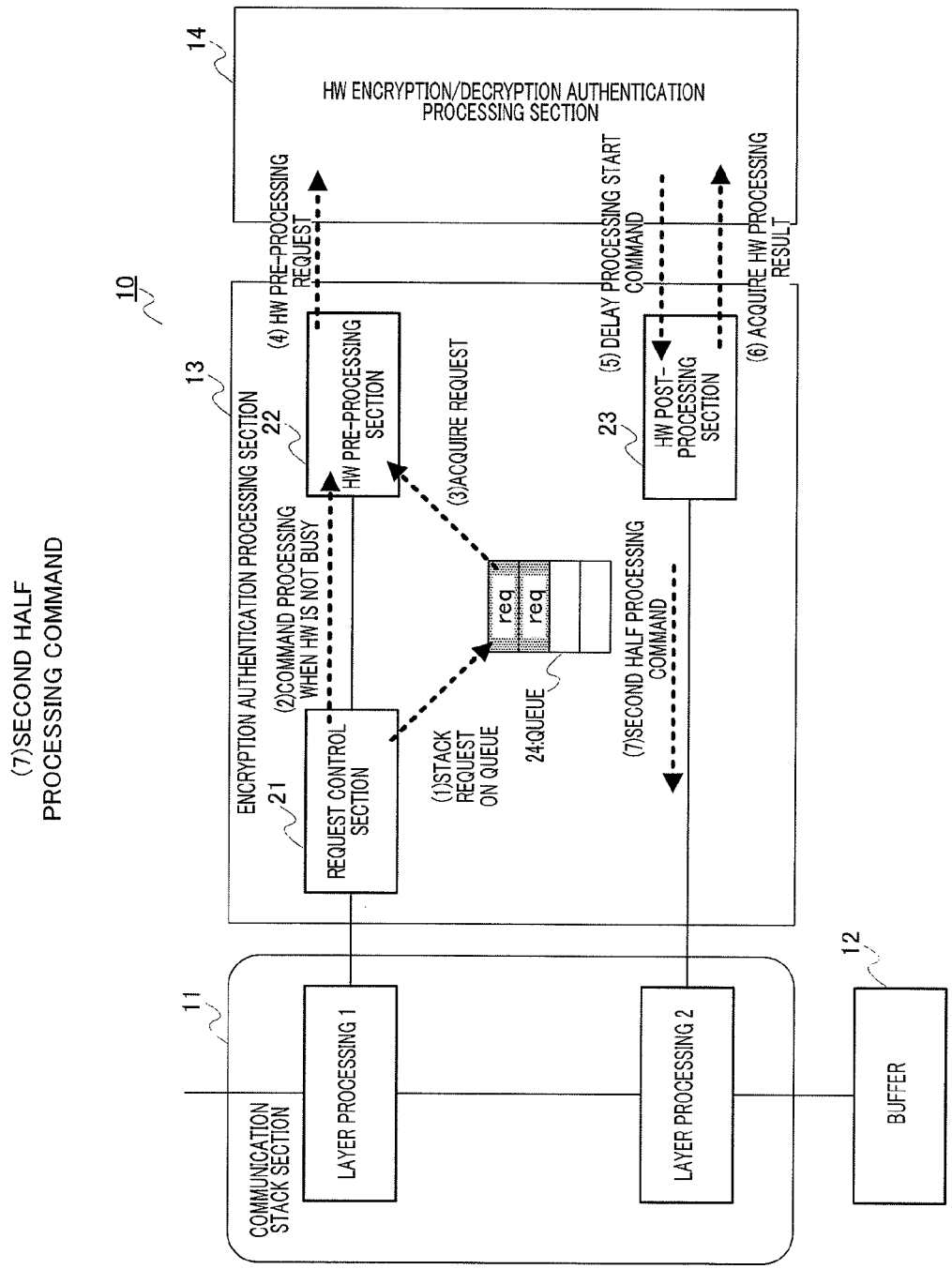
FIG. 2 shows a detailed configuration of an encryption authentication processing section in a conventional secure communication apparatus.
Figure 3:
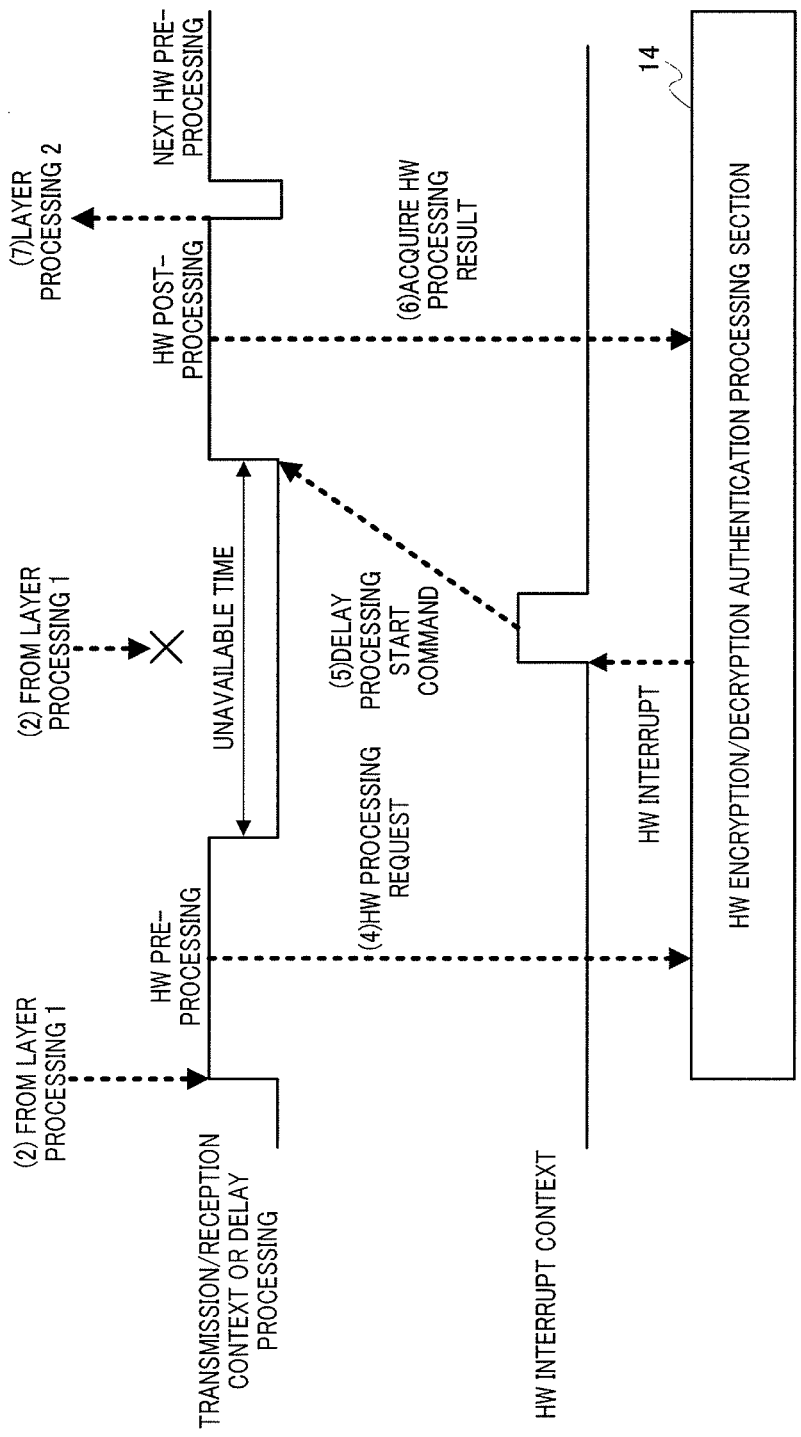
FIG. 3 is a timing chart showing operation timings in an encryption authentication processing section and HW encryption/decryption authentication processing section in a conventional secure communication apparatus.

Crypto manager 120 has request generating HW initializing section 121 that generates a request for initializing the HW engine by processing in or below the IP layer, and HW post-processing result storing section 122 that acquires and stores a HW encryption/decryption authentication result and passes it onto the above processing in the IP layer or above. Crypto manager 120 executes two processings, that is, network stack processing that needs to be performed before pre-processing ("stack first half processing") and network stack processing that needs to be performed after post-processing ("stack second half processing"), in a continuous manner, without disrupting these by encryption/decryption authentication processing (including pre-processing, HW engine processing and post-processing). Crypto manager 120 executes the two processings of processing in or above the IP layer in IP secure protocol 110 (layer processing 1, for example) and processing in the IP layer or below (layer processing 2, for example), in a continuous manner, rather than operating HW pre-processing section 22 and HW post-processing section 23 like by conventional encryption authentication processing section 13 shown in FIG. 2.

According to a HW processing request from request generating HW initializing section 121 of crypto manager 120, HW encryption/decryption authentication engine 130 request generating HW initializing section 121 from crypto manager 120, HW encryption/decryption authentication engine 130 encrypts a clear text packet to transmit to the communicating party using an encryption algorithm such as AES (Advanced Encryption Standard) and 3DES (Triple Data Encryption Standard), or attaches authentication information using an algorithm such as SHA-1 (Secure Hash Algorithm-1), or does both (that is, performs encryption and assigns authentication information). Likewise, an encrypted packet received from a communicating party is subjected to tamper detection based on the authentication information attached, decodes the encrypted packet, or performs both tamper detection and decoding. When the HW encryption/decryption authentication processing in response to a HW processing request is finished, HW encryption/decryption authentication engine 130 outputs the encryption/decryption authentication result to HW post-processing result storing section 122 of crypto manager 120.

Now, the operations of secure communication apparatus 100 configured as above will be described.

In FIG. 4, the arrows designated by numbers (1) to (3) show the process flow.

As shown in FIG. 4, crypto manager 120 executes the stack first half processing and stack second half processing for processing in or above the IP layer (layer processing 1, for example) and processing in or below the IP layer in IP secure protocol 110, in a continuous manner, without disrupting by encryption/decryption authentication processing (including pre-processing, HW engine processing and post-processing).

To be more specific, in IP secure protocol 110, processing in or below the IP layer passes processing of high priority, to request generating HW initializing section 121 of crypto manager 120. Request generating HW initializing section 121 generates a request for initializing the HW engine, based on processing of high priority passed from processing in the IP layer or below. Processings up to this are equivalent to (1) network protocol first half processing (hereinafter "first half processing").

HW encryption/decryption authentication engine 130 performs encryption/decryption authentication processing by HW according to a HW processing request from request generating HW initializing section 121 of crypto manager 120, and outputs the encryption/decryption authentication result to HW post-processing result storing section 122 of crypto manager 120. This processing is equivalent to (2) HW encryption/decryption authentication processing.

HW post-processing result storing section 122 acquires and stores the HW encryption/decryption authentication result and passes it onto processing of the IP layer or above, and this processing of the IP layer or above executes processing of the IP layer or above, based on a request of application/middle software. Processings up to here are equivalent to (3) network protocol second half processing (hereinafter "second half processing").

FIG. 5 explains equalization of load, where FIG. 5A shows (1) first half processing, (2) HW encryption/decryption authentication processing and (3) second half processing of FIG. 4 when no special control is performed, and where FIG. 5B shows (1) first half processing, (2) HW encryption/decryption authentication processing and (3) second half processing of FIG. 4 when load is equalized. In FIG. 5, the numbers inside the arrows show the order of arrival of packets. A dotted arrow of number 150 shows a timing of network protocol first half processing, and a dotted arrow of number 151 shows a delay processing start command based on a HW interrupt context.

In the event no special control is performed such as shown in FIG. 5A, request generating HW initializing section 121 performs the first half processing of the higher priority with respect to packets 1 to 4 in (1) first half processing, and issues requests for packets 1 to 4 to HW encryption/decryption authentication engine 130. In (2) HW encryption/decryption authentication processing, HW encryption/decryption authentication engine 130 performs HW encryption/decryption authentication processing of the request with respect to packet 1, amongst the requests for packets 1 to 4 issued. HW post-processing result storing section 122 acquires and stores the HW encryption/decryption authentication result with respect to packet 1 in (3) network protocol second half processing, and passes it onto processing of or above the IP layer. Although not illustrated, later, HW encryption/decryption authentication engine 130 sequentially performs HW encryption/decryption authentication processing of the requests with respect to packets 2 to 4 in (2) HW encryption/decryption authentication processing, and, in (3) second half processing, HW post-processing result storing section 122 acquires and stores the HW encryption/decryption authentication results with respect to packets 2 to 4. As shown in FIG. 5A, now that processings for packets 1 to 4 up to this point have been finished, request generating HW initializing section 121 is able to issue requests for subsequent packets 5 to 7 in (1) first half processing, to HW encryption/decryption authentication engine 130.

Even if the configuration of FIG. 4 is employed this way, when no special control is performed as shown in FIG. 5A, decrease in the bit rate and degradation of playback quality due to increased load might occur.

Consequently, in addition to the configuration of FIG. 4, load is equalized as shown in FIG. 5B.

According to the equalization of load in FIG. 5B, IP secure protocol 110 and request generating HW initializing section 121 perform network protocol first half processing (processing of or below the IP layer) for packet 1 in (1) first half processing, and issues a request for packet 1 to HW encryption/decryption authentication engine 130. HW encryption/decryption authentication engine 130 performs HW encryption/decryption authentication processing of the request for packet 1 issued, in (2) HW encryption/decryption authentication processing. IP secure protocol 110 and HW post-processing result storing section 122 acquires and store the HW encryption/decryption authentication result of packet 1 in (3) second half processing, and perform network protocol second half processing (processing in or above the IP layer). Next, IP secure protocol 110 and request generating HW initializing section 121 perform first half processing (processing in or below the IP layer) of packet 2 in (1) first half processing, and issues a request for packet 2 to HW encryption/decryption authentication engine 130. In (2) HW encryption/decryption authentication processing, HW encryption/decryption authentication engine 130 performs HW encryption/decryption authentication processing for the request for packet 2 issued. IP secure protocol 110 and HW post-processing result storing section 122 acquires and stores the HW encryption/decryption authentication result of packet 2 in (3) second half processing, and performs network protocol second half processing (processing in or above the IP layer). Next, IP secure protocol 110 and request generating HW initializing section 121 perform network protocol first half processing (processing of the IP layer or below) for packet 3 in (1) first half processing, and issues a request for packet 3 to HW encryption/decryption authentication engine 130. In (2) HW encryption/decryption authentication processing, HW encryption/decryption authentication engine 130 performs HW encryption/decryption authentication processing for the request with respect to packet 3 issued. IP secure protocol 110 and HW post-processing result storing section 122 acquires and store the HW encryption/decryption authentication result of packet 3 in (3) second half processing, and perform network protocol second half processing (processing in or above the IP layer).

Thus, by equalizing load as shown in FIG. 5B, compared to the case of FIG. 5A where no special control is performed, (1) a request does not stop in (1) first half processing, so that it is possible to equalize processing quality and minimize decrease of the bit rate.

However, according to the equalization of load as shown herein, encryption/decryption authentication processing is started at a timing of network protocol first half processing shown by a dotted arrow of number 150, so that parallel processing with HW/SW in order to maintain the order, is not possible. The present invention is designed to maintain the order of processing and HW/SW parallel processing by combining, dividing, and reordering processings.

FIG. 6A explains the equalization of load of FIG. 5B in more detail.

According to the equalization of load shown in FIG. 6A, IP secure protocol 110 and request generating HW initializing section 121 perform "network protocol first half processing (processing of or below the IP layer) with respect to packet 2 in (1) first half processing, and also perform "encryption/decryption authentication first half processing" (including request generation and HW initialization). In (2) HW encryption/decryption authentication processing, HW encryption/decryption authentication engine 130 performs HW encryption/decryption authentication processing of a request for packet 2 issued. IP secure protocol 110 and HW post-processing result storing section 122 perform "encryption/decryption authentication second half processing" (including HW post-processing and storing the result) with respect to packet 2 in (3) second half processing, and perform "network protocol second half processing" (processing of the IP layer or above).

FIGS. 6B and 6C explain the high-speed control method. FIG. 6B shows method A of a high-speed control method for performing high-speed control after equalization of load, and FIG. 6C shows method B of a high-speed control method further dividing method A.

The present high-speed control method performs the first half processing and second half processing in a series of context. That is to say, by combining the second half processing of the previous packet (processing of layer 2 or later) and processing of the next packet (layer 1 processing), packet processing can be performed without a waiting time as a time of a function.

Method A of the high-speed control method of FIG. 6B implements (1)(3) first half processing/second half processing, which combines (3) network protocol second half processing of the previous packet and (1) network protocol first half processing of the next packet. In FIG. 6B, (1)(3) first half processing/second half processing combines (3) second half processing of packet 1 of the previous packet and (1) first half processing of next packet 2. (2) HW encryption/decryption authentication processing is maintained as is. Consequently, in (1)(3) first half processing/second half processing of method A, (1)(3) first half processing/second half processing can be started at a timing of starting network protocol first half processing designated by a dotted arrow of number 152 in FIG. 6B, prior to a delay processing start command based on HW interrupt context designated by a dotted arrow of number 151 in FIG. 6A. Consequently, with method A, processing can be started at the earlier timing between a timing to start network protocol first half processing designated by a doted arrow of number 152 in FIG. 6B, and a delay processing start command based on HW interrupt context designated by a dotted arrow of number 151 in FIG. 6A. Even if (1) first half processing and (3) second half processing have different priorities, these processings do not stop and can be implemented smoothly.

Scheme B of FIG. 6C implements even faster control by implementing HW/SW parallel 1 processing by reordering the processings of method A. Reordering of processings is as follows, shown by (i)-(iv).
(i) Network protocol first half processing
(ii) Encryption/decryption authentication second half processing
(iii) Encryption/decryption authentication first half processing
(iv) Network protocol second half processing
To explain the reordering of the above processings in detail, in FIG. 6C, packets 1 and packet 2 in FIG. 6B are subject to the following reordering processing.
(i) First half processing of second packet 2
(ii) HW second half processing of first packet 1
(iii) HW first half processing of second packet 2
(iv) Processing of layer 2 or later of first packet 1
After HW encryption/decryption processing is finished, there is some loss (extra processing) until second half processing actually starts. Other processings may enter, or kernel processing may be performed. With method B of FIG. 6C, shortly after (i) network protocol first half processing, above (ii) decryption/encryption authentication second half processing is started, in one sequence, by reordering the processings. Following this, shortly after (iii) encryption/decryption authentication first half processing, above (iv) network protocol second half processing is performed in a continuous manner, so that a delay processing start command based on the HW interrupt context of number 151. That is to say, when there is a function call from an upper program, above (i) through (iv) are executed in a continuous manner, without loss, so that a delay processing start command of number 151 is not necessary. With the load equalization of FIG. 6A, a HW interrupt occurs, and a delay processing start command of number 151 is issued to start second half processing. However, in actuality, there are cases where the next packet arrives before that. In this case, with method B of FIG. 6C, second half processing can be stared without waiting for a start command, leading to improved speed. Whether a packet transmission command is the first or a HW processing completion (HW interrupt) is the first, is competed, and processing is started according to the earlier one. By this means, HW/SW parallel processing can be implemented by reordering processings.

Embodiment 1

Figure 7:
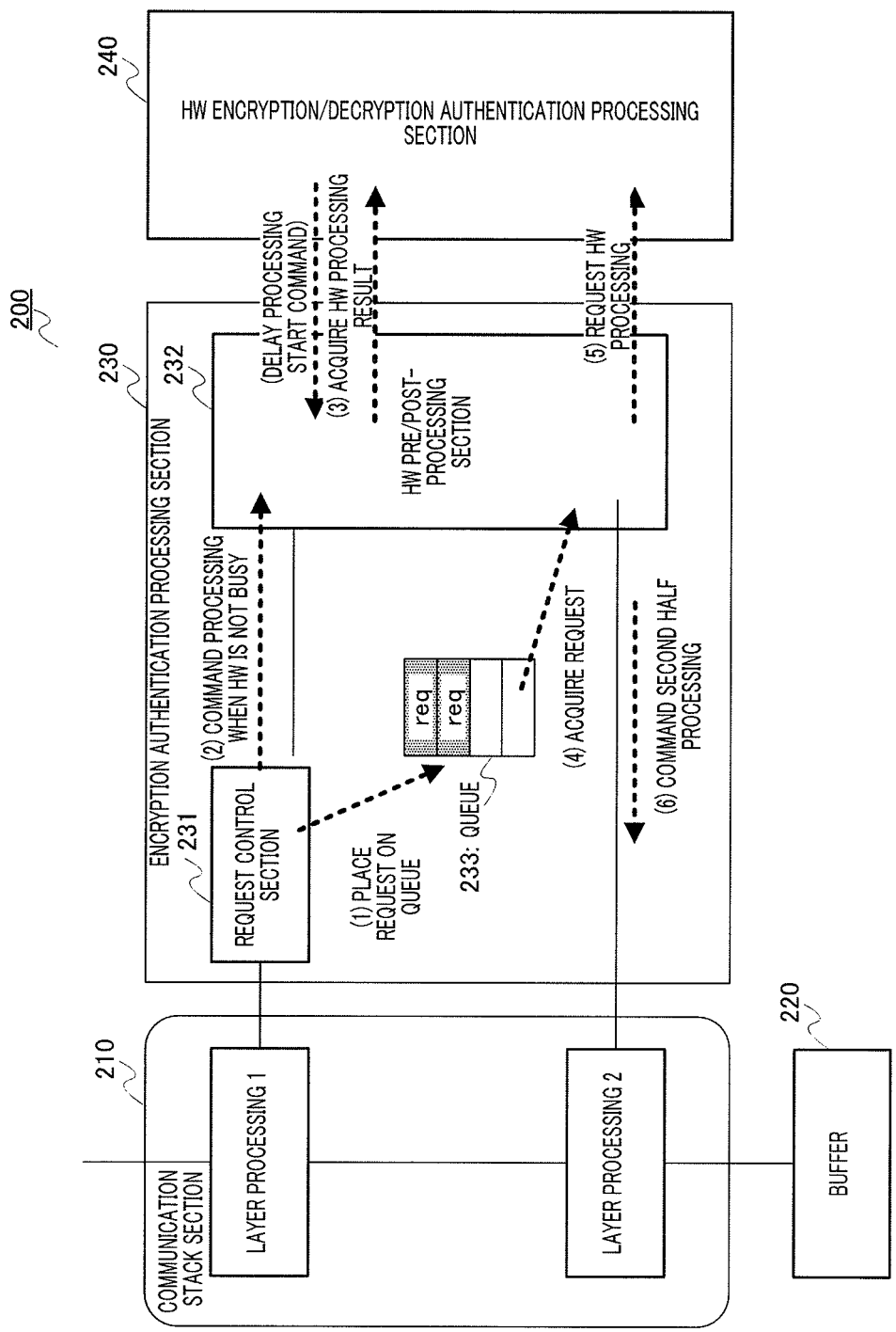
FIG. 7 shows a configuration of a secure communication apparatus according to embodiment 1 of the present invention.

FIG. 7 shows a configuration of a secure communication apparatus of an encrypted information communication system according to embodiment 1 of the present invention based on the above basic concepts.

In FIG. 7, secure communication apparatus 200 is configured with communication stack section 210 that executes layer processing 1 and layer processing 2, buffer 229 that stores received/transmitting information on a temporary basis, and encryption authentication processing section 230 that issues a HW processing request to a HW engine and executes encryption authentication processing, and HW encryption/decryption authentication processing section 240 that executes encryption/decryption authentication processing by means of the HW engine. Encryption authentication processing section 230 has request control section 231, HW pre/post-processing section 232, and queue 233.

HW pre/post-processing section 232 performs the first half processing and the second half processing in a series of context by method A of FIG. 6B or by method B of FIG. 6C. In the event method B of FIG. 6C is employed, HW pre/post-processing section 232 performs (i) network protocol first half processing, (ii) encryption/decryption authentication second half processing, (iii) encryption/decryption authentication first half processing, or (iv) network protocol second half processing, in a continuous manner. To be more specific, HW pre/post-processing section 232 issues a HW processing request to HW encryption/decryption authentication processing section 240 according to the request acquired (see (5)), and meanwhile receives a delay processing start command based on HW interrupt context from HW encryption/decryption authentication processing section 240, acquires the HW processing result from HW encryption/decryption authentication processing section 240 and executes HW post-processing (see (6)). Layer processing 1 and layer processing 2 here are subject to the processing of reordering processings in FIG. 6B. For example, (i) first half processing of second packet 2, (ii) HW second half processing of first packet 1, (iii) HW first half processing of second packet 2 or (iv) processing of layer 2 or later of first packet 1, may be performed.

The operations of secure communication apparatus 200 configured as above will be described below.

Figure 8:
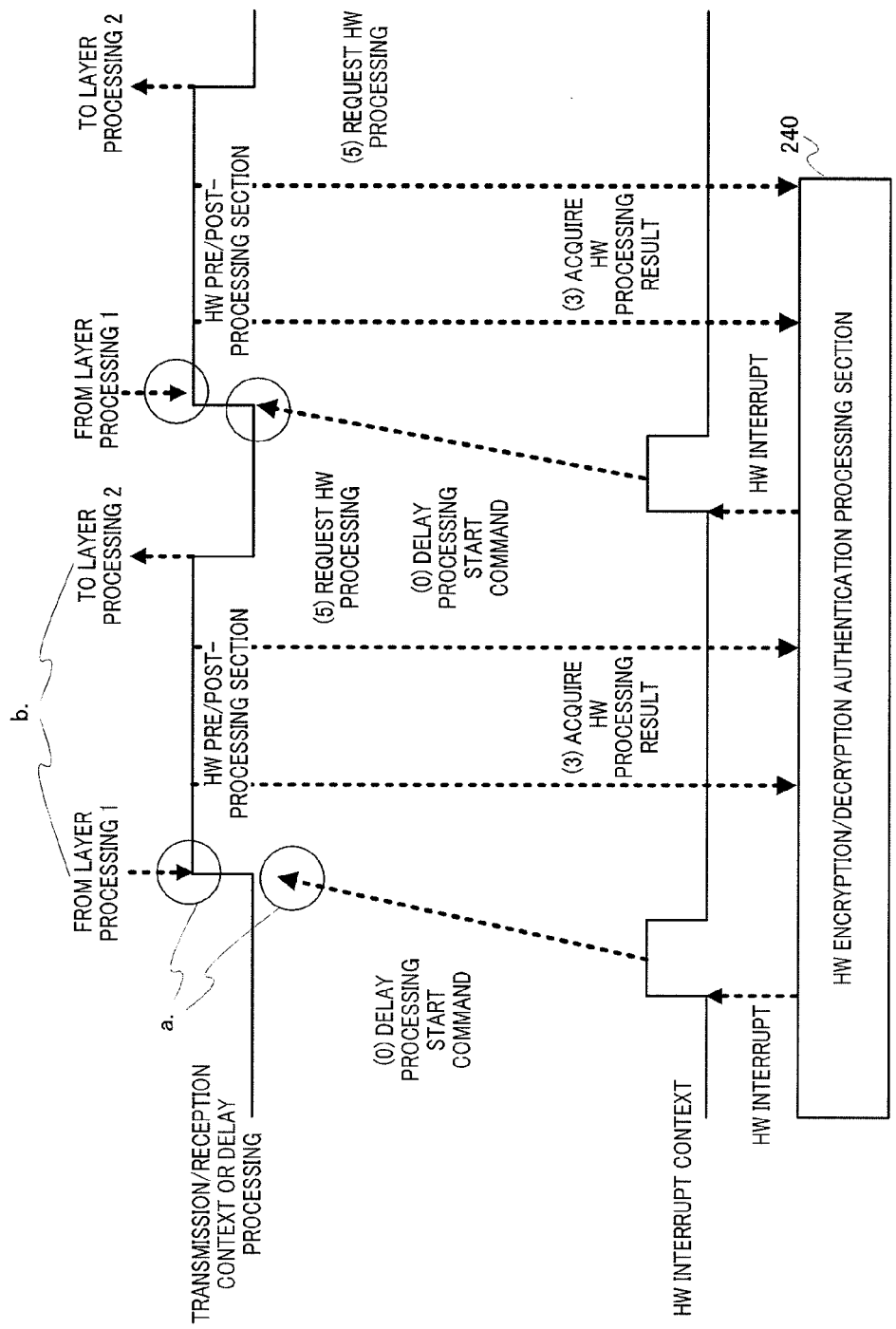
FIG. 8 is a timing chart showing operation timing in an encryption authentication processing section and HW encryption/decryption authentication processing section in a secure communication apparatus according to embodiment 1.

FIG. 8 is a timing chart showing operation timings of encryption authentication processing section 230 and HW encryption/decryption authentication processing section 240. In FIG. 7 and FIG. 8, numbers (1) to (6) are codes for explaining the process flow.

In normal communication stack processing, communication stack section 210 executes layer processing 1 and layer processing 2 via buffer 120 by a transmission command or a reception interrupt. Layer processing 1 is network protocol first half processing and upper layer processing of high priority, including TCP protocol processing and part of IP protocol processing. Layer processing 2 is network protocol second half processing and lower layer processing, including part of IP protocol processing or lower layer processing.

In the event HW encryption authentication is performed, upon receiving a transmission command or a reception interrupt, communication stack section 210 commands processing to encryption authentication processing section 230 in layer processing 1, and encryption authentication processing section 230 issues a HW processing request to HW encryption/decryption authentication processing section 240.

HW encryption/decryption authentication processing section 240 receives this HW processing request, performs encryption/decryption authentication processing by means of HW and returns delay processing for completing encryption authentication processing, to communication stack section 210, via encryption authentication processing section 230. Communication stack section 210 receives the encryption authentication processing result in encryption authentication processing section 230, and executes layer processing 2 via buffer 220.

To be more specific, encryption authentication processing section 230 performs the following operations.

When encryption authentication processing is commanded from layer processing 1 of communication stack section 210, request control section 231 stacks this request in queue 233 (see (1)). When HW is not busy, request control section 21 commands HW pre-processing to HW pre-processing section 22 (see (2)).

When there is a request having been processed, HW pre/post-processing section 232 acquires HW processing result from HW encryption/decryption authentication processing section 240 (see (3)) and executes HW post-processing. Upon finishing HW post-processing, HW pre/post-processing section 232 commands second half processing to layer processing 2 (see (6)).

If a request is stacked in queue 233, HW pre/post-processing section 232 acquires the request from queue 233 (see (4)), and, based on the acquired request, issues a HW processing request to HW encryption/decryption authentication processing section 240 (see (5)).

HW encryption/decryption authentication processing section 240 performs encryption/decryption authentication processing according to HW processing request from HW pre/post-processing section 232 (see (5)). When encryption/decryption authentication processing in response to the HW processing request is finished, HW encryption/decryption authentication processing section 240 issues HW interrupt context (see FIG. 8), and outputs a delay processing start command based on this HW interrupt context to HW pre/post-processing section 232 (see (0)).

As shown by code "a" in FIG. 8, HW pre/post-processing section 232 starts processing according to the earlier one of a delay processing start command (see (0)) from HW encryption/decryption authentication processing section 240, and a command from layer processing 1. HW pre/post-processing section 232 is able to start HW pre/post-processing soon by either command, and so, from the perspective of layer processing 1, there is no time in which layer processing 1 cannot be used.

HW pre/post-processing section 232 executes HW post-processing acquires HW processing result from HW encryption/decryption authentication processing section 240 (see (3)). When HW post-processing is finished, HW pre/post-processing section 232 commands second layer processing to layer processing 2. Communication stack section 210 executes layer processing 2.

As shown by code "b" in FIG. 8, encryption authentication processing section 230 performs layer processing 1 and layer processing 2 by the same context, without time for waiting for HW processing.

By this means, when there is a request having been processed, HW pre/post-processing section 232 of encryption authentication processing section 230 acquires the HW processing result (see (3)) and issues a second half processing command (see (6)). When a request is stacked in queue 233, HW pre-processing (see (4) and (5)) is performed. Upon a delay processing start command from HW encryption/decryption authentication processing section 240 (see (0)), HW pre/post-processing section 232 references queue 233 and performs the same processing.

Encryption authentication processing section 230 is able to perform layer processing 2 and later processing in the same sequence with layer processing 1, so that the time subsequent processing cannot be performed is shortened and the performance improves. With a conventional example, the time after HW pre-processing section 22 finishes HW pre-processing, until HW post-processing section 23 starts HW post-processing, is a period of time in which HW post-processing section 23 is unable to perform HW post-processing. By contrast with this, encryption authentication processing section 230 can execute HW post-processing and next HW processing request earlier than HW post-processing section 23 (conventional example shown in FIG. 2) is started by a delay processing start command, so that the efficiency of use of HW encryption/decryption authentication processing section 240 can be improved.

Embodiment 2

Figure 9:
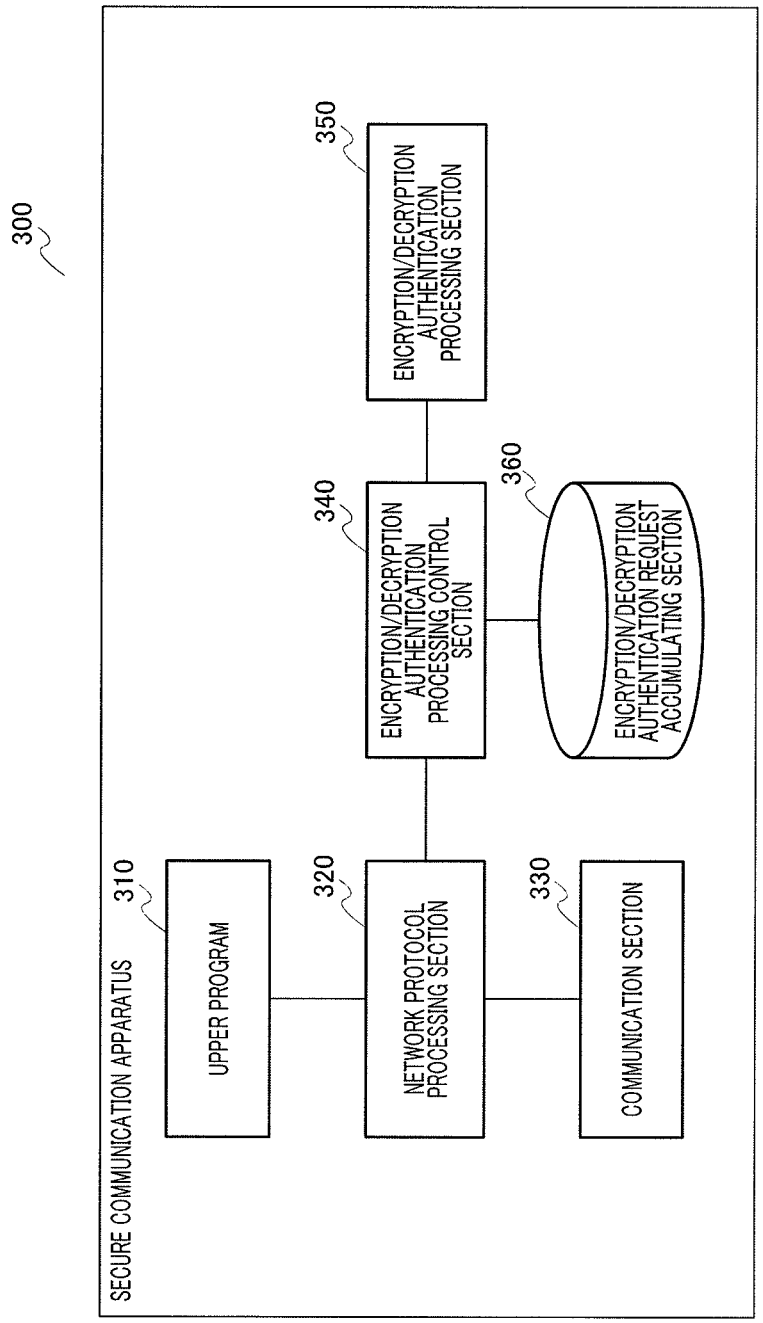
FIG. 9 is a block diagram showing a configuration of a secure communication apparatus according to embodiment 2.

FIG. 9 is a block diagram showing a configuration of a secure communication apparatus in an encrypted information communication system according to embodiment 2 of the present invention.

In FIG. 9, secure communication apparatus 300 is configured with upper program 310, network protocol processing section 320, communication section 330, encryption/decryption authentication processing control section 340, encryption/decryption authentication processing section 350, and encryption/decryption authentication accumulating section 360.

Upper program 310, network protocol processing section 320 and encryption/decryption authentication processing control section 340 are implemented by means of a CPU.

Secure communication apparatus 300 is connected with a partner secure communication apparatus with which secure communication apparatus 300 performs secure communication, via communication section 330, so that communication is possible between these secure communication apparatuses.

Upper program 310 is an application trying to actually transmit and receive encrypted data or another program.

Network protocol processing section 320 performs network protocol processing for, for example, the transport layer and the network layer. To be more specific, according to a command from upper program 310, network protocol processing section 320 performs network protocol upper layer processing of arbitrary data (including, for example, TCP protocol processing and part of IP protocol processing), and, using a clear text packet having been processed as an encryption/decryption authentication request together with parameters required for encryption/decryption authentication processing, asks encryption/decryption authentication processing control section 340 to perform encryption authentication processing.

Furthermore, according to a command from encryption/decryption authentication processing control section 340, network protocol processing section 320 performs network protocol lower layer processing (part of IP protocol processing or lower processing) of an encrypted packet having been subjected to encryption authentication processing, and commands communication section 330 to perform transmission processing of the encrypted packet having been processed.

Network protocol processing section 320 receives the encrypted packet received in communication section 330, performs network protocol lower layer processing, and, using the encrypted packet having been processed as an encryption/decryption authentication request together with parameters required for encryption/decryption authentication processing, asks encryption/decryption authentication processing control section 340 to perform encryption authentication processing.

Furthermore, according to a command from encryption/decryption authentication processing control section 340, network protocol processing section 320 performs network protocol upper layer processing of a clear text packet having been subjected to encryption authentication processing, and stores the clear text packet having been processed, in a receiving buffer of upper program 310.

Communication section 330 performs transmission processing of an arbitrary packet according to a command from network protocol processing section 320. Communication section 330 receives data which the counterpart secure communication apparatus has transmitted, and transfers the data to network protocol processing section 320. To be more specific, network devices that are capable of IP communication, such as cable LAN and wireless LAN, are preferable.

Based on an encryption/decryption authentication command from network protocol processing section 320, encryption/decryption authentication processing control section 340 commands encryption/decryption authentication processing section 350 to perform encryption/decryption authentication processing of clear text/encrypted data stored in an encryption/decryption authentication request.

In the event encryption/decryption authentication accumulating section 360 stores an encryption/decryption authentication request, encryption/decryption authentication processing control section 340 asks encryption/decryption authentication processing section 350 to perform encryption/decryption authentication processing of the encryption/decryption authentication request stored in advance, and, stores the encryption/decryption authentication request requested from network protocol processing section 320 in encryption/decryption authentication accumulating section 360.

When processing is in progress in encryption/decryption authentication processing section 350, encryption/decryption authentication processing control section 340 stores an encryption/decryption authentication request in encryption/decryption authentication accumulating section 360 and finishes the processing.

To be more specific, encryption/decryption authentication processing control section 340 acquires the previous packet having been subjected to encryption/decryption processing or authentication processing from encryption/decryption authentication processing section 350, and controls network protocol processing section 320 to perform network protocol second half processing of the previous packet and network protocol first half processing for the next packet in a continuous manner.

When there is an encryption/decryption authentication request having been processed in encryption/decryption authentication processing section 350, encryption/decryption authentication processing control section 340 first performs encryption/decryption authentication completion processing of the encryption/decryption authentication request having been processed, and requests encryption/decryption authentication processing section 350 to perform encryption/decryption authentication processing of a newly commanded encryption/decryption authentication request. Afterward, encryption/decryption authentication processing control section 340 commands network protocol processing section 320 to perform network protocol second half processing (lower layer processing when a command has been received from upper layer processing, or upper layer processing when a command has been received from lower layer processing) of encrypted data having been subjected to encryption/decryption authentication completion processing in the same CPU context, and, when network protocol second half processing is finished, finishes the processing in encryption/decryption authentication processing control section 340. The details of processing will be described later.

According to an encryption/decryption authentication start command from encryption/decryption authentication processing control section 340, encryption/decryption authentication processing section 350 starts encryption/decryption authentication processing, and, when encryption/decryption authentication processing is complete, sends a processing completion report to encryption/decryption authentication processing control section 340. To be more specific, it is preferable to send a processing completion report by means of a software interrupt woken up by hardware interrupt processing. Afterward, encryption/decryption authentication processing section 350 performs completion processing for acquiring the result and accompanying data according to an encryption/decryption completion processing command from encryption/decryption authentication processing control section 340.

Encryption/decryption authentication accumulating section 360 sets the priorities of packets having been subjected to network protocol first half processing, on a per packet basis, accumulates these as encryption/decryption authentication requests with parameters required for encryption/decryption processing or authentication processing, and passes these encryption/decryption authentication requests to encryption/decryption authentication processing section 350 in the order of their priorities. Encryption/decryption authentication accumulating section 360 is a queue structure for inputting and outputting encryption/decryption authentication requests. Generally, although encryption/decryption authentication accumulating section 360 is generally designed in an FIFO (First-In First-Out) configuration, other configurations are equally possible by which, for example, encryption/decryption authentication requests to dequeue are assigned priorities based on information about the packet TOS (Type of Service) field, transmission/reception addresses, transmission/reception ports and protocols and so on. The TOS field is eight-bit-long information contained in an IP header, and the upper three bits are an IP presidency that represents the priority.

The operations of secure communication apparatus 300 configured as above will be explained.

First, a case will be explained where secure communication apparatus 300 functions as an encrypted packet receiving side.

Figure 10:
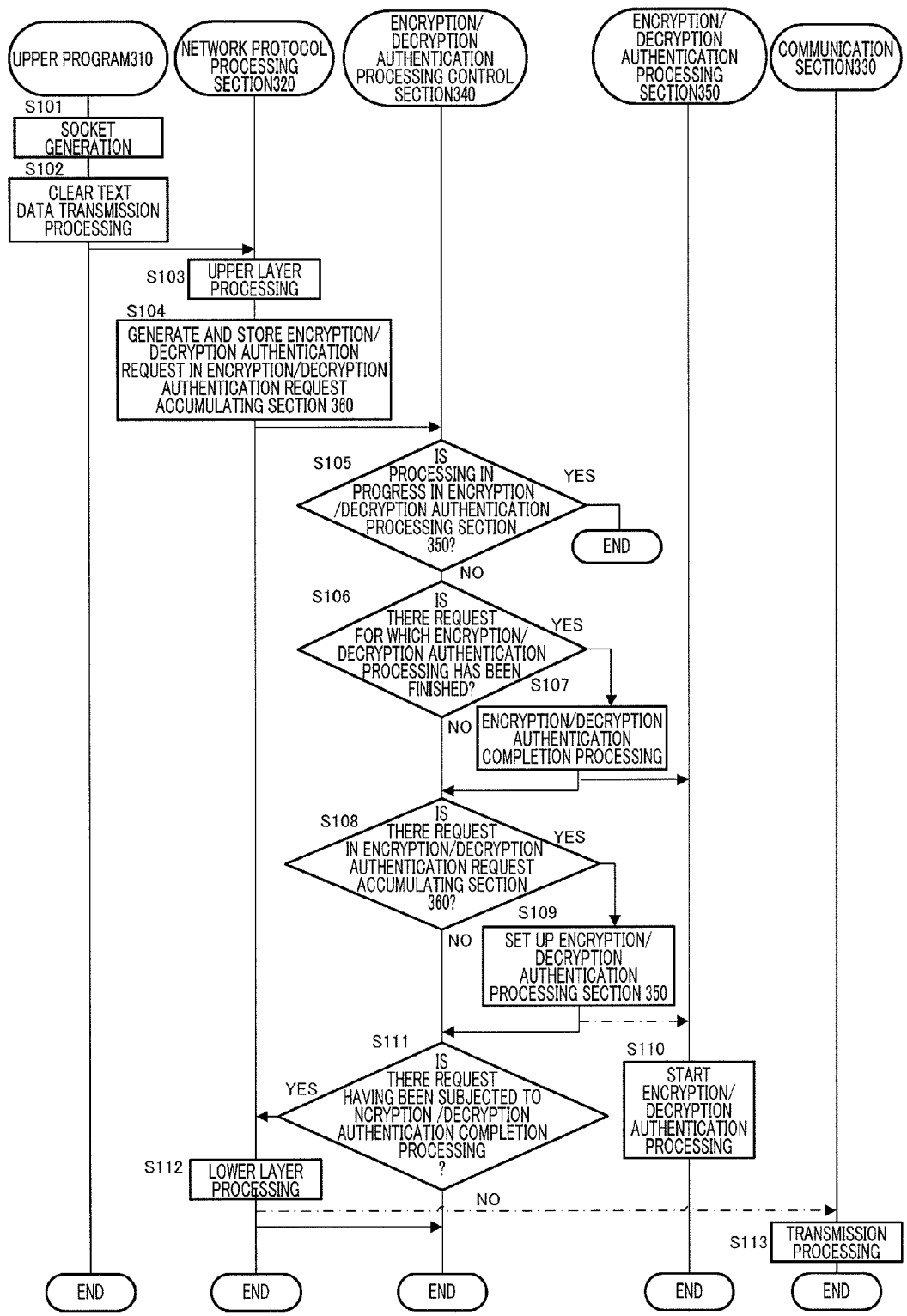
FIG. 10 is a control sequence diagram for explaining the operations upon secure communication processing when a secure communication apparatus according to embodiment 2 functions as a receiving side.

FIG. 10 is a control sequence diagram for explaining the operation upon secure communication processing when secure communication apparatus 300 functions as a receiving side. In FIG. 10, upper program 310, network protocol processing section 320 and encryption/decryption authentication processing control section 340 are implemented by means of a CPU.

In step S101, upper program 310 generates a socket and binds address information, port information and so on of the counterpart secure communication apparatus.

In step S102, upper program 310 asks network protocol processing section 320 to process clear text data to be encrypted, via a socket.

In step S103, network protocol processing section 320 restructures the received clear text data into a clear text packet, on a per maximum transmission unit basis, and performs network protocol upper layer processing (including TCP protocol processing or part of IP protocol processing).

In step S104, network protocol processing section 320 stores the clear text packet as an encryption/decryption authentication request in encryption/decryption authentication accumulating section 360, with parameters required for encryption/decryption authentication processing, and commands encryption authentication processing to encryption/decryption authentication processing control section 340. Processings up till here, implemented by means of a CPU, are equivalent to (i) network protocol first half processing for second packet 2 shown in FIG. 6B, for example.

In step S105, encryption/decryption authentication processing control section 340 decides whether processing is not in progress in encryption/decryption authentication processing section 350. When processing is in progress in encryption/decryption authentication processing section 350, the processing is finished.

In step S106, encryption/decryption authentication processing control section 340 decides whether or not there is a request for which encryption/decryption authentication processing has been finished, in encryption/decryption authentication processing section 350.

In step S107, encryption/decryption authentication processing control section 340 performs encryption/decryption authentication completion processing for an encryption/decryption for which encryption/decryption authentication processing has been finished in encryption/decryption authentication processing section 350. Processings from step S105 through step S107 implemented by means of a CPU, are equivalent to (ii) HW second half processing of first packet 1.

In step S108, encryption/decryption authentication processing control section 340 decides whether or not encryption/decryption authentication request is stored in encryption/decryption authentication accumulating section 360.

When there is an encryption/decryption authentication request in encryption/decryption authentication accumulating section 360, in step S109, encryption/decryption authentication processing control section 340 performs the setup in encryption/decryption authentication processing section 350. To be more specific, encryption/decryption authentication processing control section 340 commands encryption/decryption authentication processing to encryption/decryption authentication processing section 350 using clear text/encrypted data stored in encryption/decryption authentication request and information required for encryption/decryption authentication processing. The processings of step S108 and step S109 implemented by means of a CPU are equivalent to, for example, (iii) HW first half processing of second packet 2 shown in FIG. 6B.

In step S110, encryption/decryption authentication processing section 350 starts encryption/decryption authentication processing based on a command from encryption/decryption authentication processing control section 340. Encryption/decryption authentication processing is implemented asynchronously, without waiting for processing to be finished.

In step S111, when there is an encryption/decryption authentication request subjected to encryption/decryption authentication completion processing in above step S107, encryption/decryption authentication processing control section 340 commands network protocol processing section 320 to perform network protocol second half processing (lower layer processing when a command has been received from upper layer processing or upper layer processing when a command has been received from lower layer processing) in the same CPU context.

In step S112, network protocol processing section 320 performs network protocol lower layer processing, and commands communication section 330 to transmit encrypted packets having been processed. The processings of step S111 and step S112 implemented by means of a CPU, are equivalent to (iv) layer 2 or later processing for first packet 1 shown in FIG. 6B.

In step S113, communication section 330 transmits encrypted packets received from network protocol processing section 320, to a counterpart secure communication apparatus (partner secure communication apparatus).

Thus, from step S101 to step S112, first half processing and second half processing are performed in a series of CPU context. By performing second half processing for the previous packet (layer 2 or later processing) and processing of the next packet (layer 1 processing) in a continuous manner, packet processing can be performed without a waiting time as a time of a function. That is to say, encryption/decryption authentication processing control section 340 implements layer 2 or later processing only by reporting a request, without returning a function (in other words, in the same CPU context), and then returns the function. Encryption/decryption authentication processing control section 340 does not return a function in the middle, so that one-sequence execution is possible. Therefore, when network protocol processing of a received packet is performed, processing up to upper layers can be implemented in the same context, without disrupting processing by encryption/decryption authentication processing.

Next, operations in the event secure communication apparatus 300 is an encrypted information communication apparatus on the transmitting side, will be described. This case is equivalent to operations when encryption/decryption authentication processing is finished in encryption/decryption authentication processing section 350.

Figure 11:
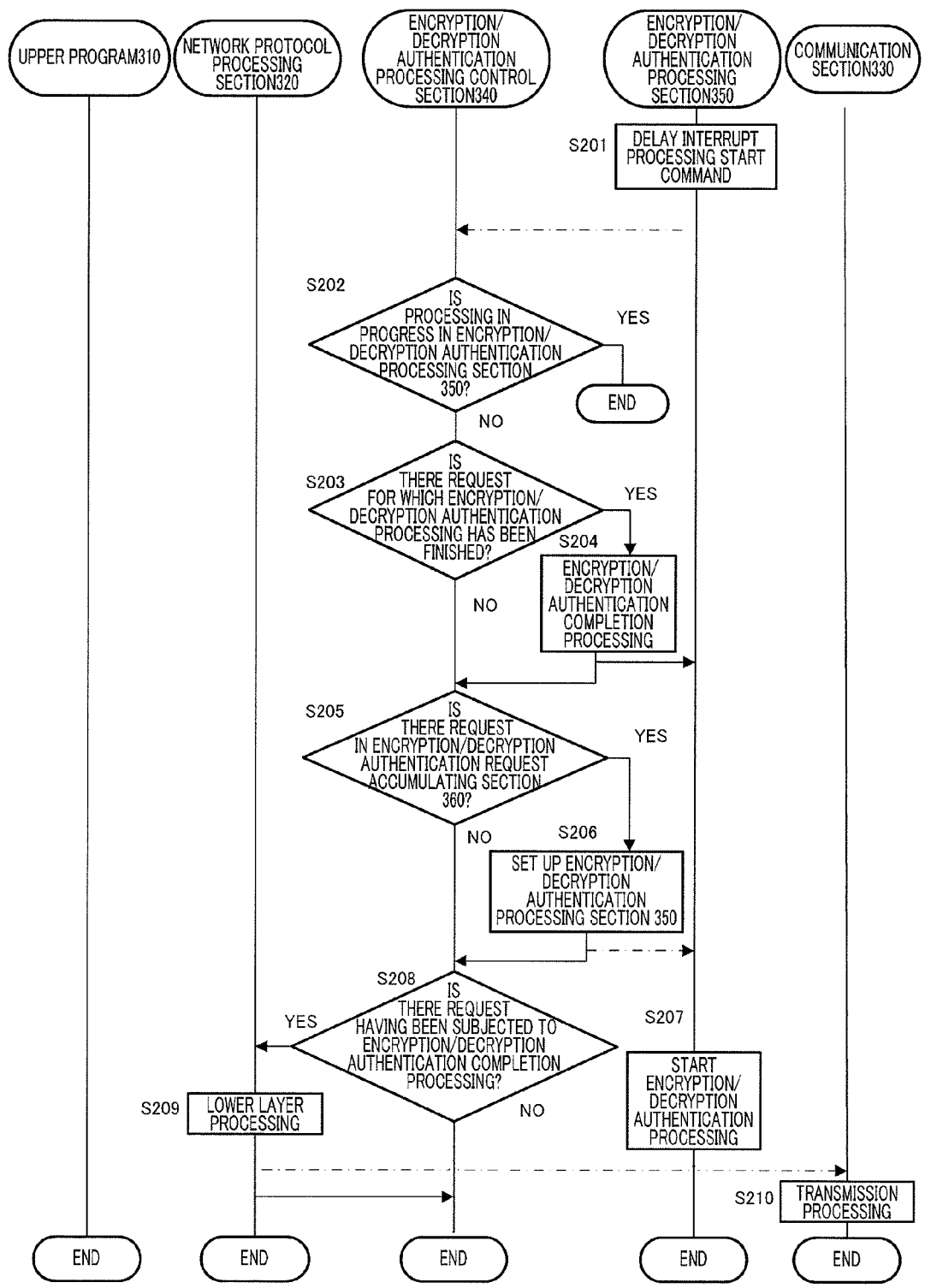
FIG. 11 is a control sequence diagram for explaining the operations upon secure communication processing by a secure communication apparatus.

FIG. 11 is a control sequence diagram for explaining the operations of secure communication processing by secure communication apparatus 300.

In step S201, encryption/decryption authentication processing section 350 commands encryption/decryption authentication processing control section 340 to start software delay interrupt processing to start processing of step S202 and later processing.

In step S202, encryption/decryption authentication processing control section 340 decides whether processing is not in progress in encryption/decryption authentication processing section 350. When processing is in progress in encryption/decryption authentication processing section 350, processing is terminated.

In step S203, encryption/decryption authentication processing control section 340 decides whether or not there is an encryption/decryption authentication request for which encryption/decryption authentication processing has been finished, in encryption/decryption authentication processing section 350.

In step 204, encryption/decryption authentication processing control section 340 performs encryption/decryption authentication processing of an encryption/decryption authentication request for which encryption/decryption authentication processing has been finished, in encryption/decryption authentication processing section 350.

In step S205, encryption/decryption authentication processing control section 340 decides whether or not an encryption/decryption authentication request is stored in encryption/decryption authentication accumulating section 360.

When there is an encryption/decryption authentication request in encryption/decryption authentication accumulating section 360, in step S206, encryption/decryption authentication processing control section 340 sets up encryption/decryption authentication processing section 350. To be more specific, encryption/decryption authentication processing control section 340 commands encryption/decryption authentication processing to encryption/decryption authentication processing section 350 using clear text/encrypted data stored in an encryption/decryption authentication request and parameters required for encryption/decryption authentication processing.

In step S207, encryption/decryption authentication processing section 350 starts encryption/decryption authentication processing based on a command from encryption/decryption authentication processing control section 340. Here, the encryption/decryption authentication processing is executed asynchronously, without waiting for the processing to be finished.

If there is an encryption/decryption authentication request having been subjected to encryption/decryption authentication completion processing in step S207 above, encryption/decryption authentication processing control section 340 commands network protocol processing section 320 to perform network protocol second half processing (lower layer when a command has been received from upper layer processing or upper layer processing when a command has been received from lower layer processing) in the same CPU context.

In step S209, network protocol processing section 320 performs network protocol lower layer processing and commands communication section 330 to transmit encrypted packets having been processed.

In step S210, communication section 330 transmits encrypted packets having been received from network protocol processing section 320 to a counterpart secure communication apparatus (partner secure communication apparatus).

As described above in detail, according to the present embodiment, encryption/decryption authentication processing control section 340 of secure communication apparatus 300 acquires a processing result of the previous packet from encryption/decryption authentication processing section 350, and controls network protocol processing section 320 to perform network protocol second half processing of the previous packet and network protocol first half processing of the next packet, in a continuous manner. For example, when requested to perform encryption/decryption processing or authentication processing of the next packet for which network protocol first half processing has been finished, from network protocol processing section 320, encryption/decryption authentication processing control section 340 acquires a processing result of the previous packet for which encryption/decryption processing has been finished shortly before from encryption/decryption authentication processing section 350, and network protocol processing section 320 performs network protocol second half processing of the previous packet. By this means, when network protocol processing of a received packet is performed, processings up to upper layers can be performed in the same context, without disrupting processing by encryption/decryption authentication processing. As a result, encryption/decryption processing or authentication processing whereby CPU and HW engine load is less likely to be distributed unevenly can be performed, without producing overhead by disrupting processing. Consequently, high-speed secure transmission processing can be executed for devices that require particularly high speed such as router and gateway devices and terminals having only less powerful resources such as embedded devices.

Furthermore, with the present embodiment, after acquiring a processing result of the previous packet from encryption/decryption authentication processing section 350, encryption/decryption authentication processing control section 340 requests encryption/decryption authentication processing section 350 to perform encryption/decryption processing or authentication processing of the next packet in the same CPU context, before network protocol processing section 320 performs network protocol second half processing of the previous packet. With this configuration, after packet processing of the first packet is finished, a request encryption/decryption processing or authentication processing for a second packet can be issued, without changing the CPU context, so that it is possible to speed up encryption/decryption processing or authentication processing. Furthermore, the time in which encryption/decryption authentication processing section 350 does not operate can be minimized, so that it is possible to speed up encryption/decryption processing or authentication processing and use the encryption/decryption authentication processing means efficiently.

Furthermore, with the present embodiment, encryption authentication processing control section 340 performs encryption/decryption authentication second half processing for acquiring a processing result of the previous packet having been processed, by means of completion hardware interrupt context or a software delay interrupt context from encryption/decryption authentication processing section 350, and, when there is a next packet for which network protocol first half processing has been finished, performs encryption/decryption authentication first half processing to request encryption/decryption authentication processing section 350 to perform encryption/decryption processing or authentication processing of the same packet in the same CPU context, and controls network protocol processing section 320 to perform network protocol second half processing of the previous packet. With this configuration, encryption/decryption authentication processing control section 340 can be operated at the earlier timing between network protocol first half processing and a completion hardware interrupt (or a software delay interrupt), so that it is possible to speed up encryption/decryption processing or authentication processing.

Furthermore, with the present embodiment, encryption/decryption authentication processing control section 340 makes network protocol processing section 320 and encryption/decryption authentication processing section 350 perform parallel processing by reordering the processings into the order of: (i) network protocol first half processing for a next packet; (ii) encryption/decryption authentication second half processing for a previous packet, (iii) encryption/decryption authentication first half processing for a next packet, and (iv) network protocol second half processing for a previous packet, so that it is possible to maintain the order of processings and realize HW/SW parallel processing by combining, dividing, and reordering processings.

Furthermore, the present embodiment has encryption/decryption authentication processing section 350 that assigns priorities to packets for which network protocol first half processing has been finished, on a per packet basis, accumulates these as encryption/decryption authentication requests with parameters required for encryption/decryption processing, and passes these requests to encryption/decryption authentication processing section 350 in the order of their priorities, so that it is possible to speed up transmitting/received packets that need to be processed with high priority such as AV streaming.

Embodiment 3

Another operation example of a secure communication apparatus will be described with embodiment 3.

The hardware configuration of the secure communication apparatus according to embodiment 3 of the present invention is the same as secure communication apparatus 300 shown in FIG. 9 and will not be described here.

Figure 12:
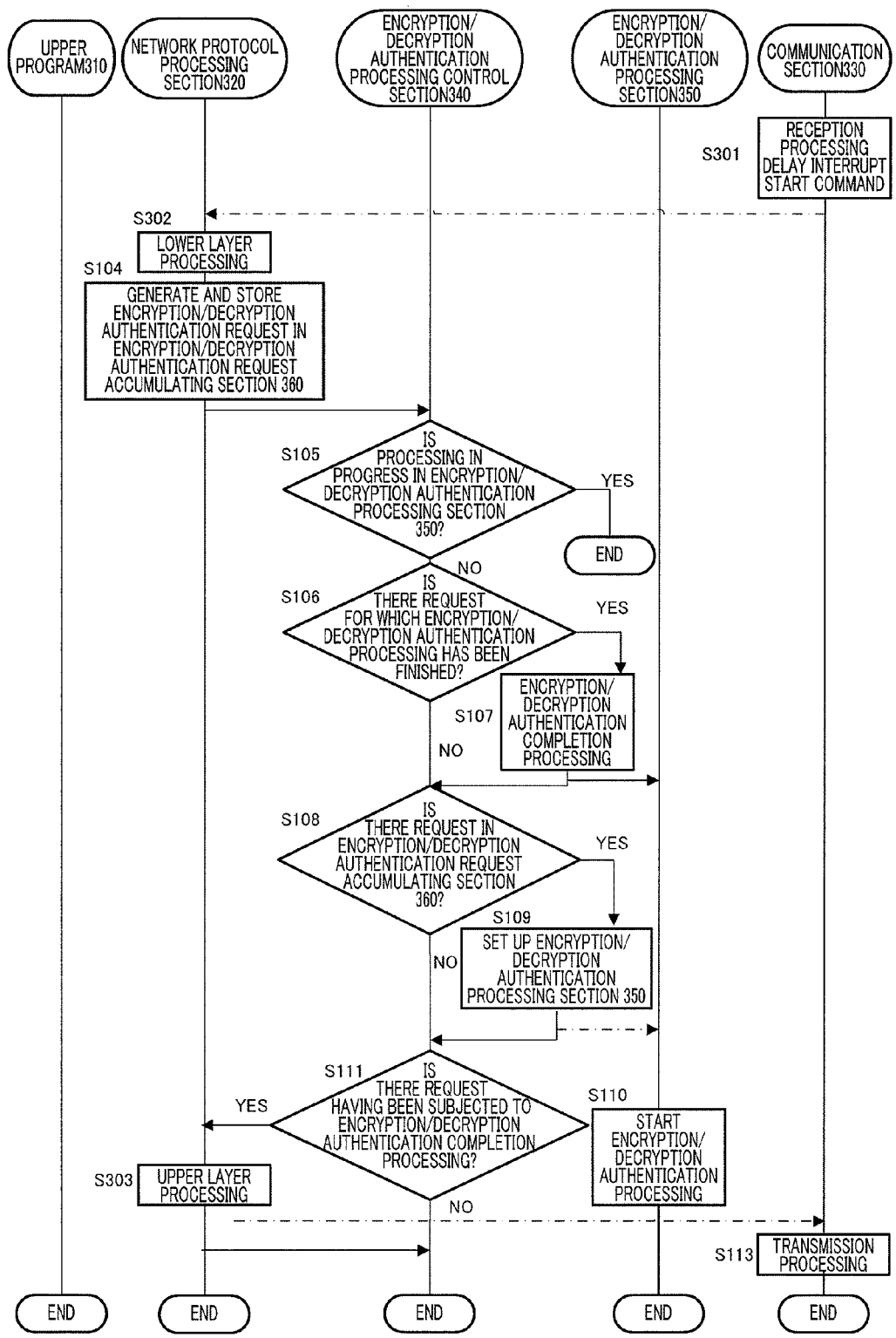
FIG. 12 is a control sequence diagram for explaining the operations when a secure communication apparatus according to embodiment 3 of the present invention functions as a receiving side.

FIG. 12 is a control sequence diagram for explaining the operations upon secure communication processing in the event secure communication apparatus 300 functions as a receiving side. Steps for performing the same processing as in the flow of FIG. 10 will be assigned the same step numbers and will not be described here.

In step S301, communication section 330 issues a command to start software delay interrupt processing for performing the processing of step S302 and later processing, to process encrypted packets having been received from a counterpart secure communication apparatus.

In step S302, network protocol processing section 320 performs network protocol lower layer processing of a received encrypted packet (part of IP protocol processing and lower layer processing than that).

The processings from step S104 to step S111 are equivalent with the corresponding processings in FIG. 10.

In step S303, network protocol processing section 320 performs network protocol upper layer processing (TCP protocol processing or part of IP protocol processing) and stores a clear text packet having been processed, in upper program 310.

Next, operations in the event where secure communication apparatus 300 is an encrypted information communication apparatus on a transmitting side will be explained as an example. This case is equivalent to the operations in the event encryption/decryption authentication processing in encryption/decryption authentication processing section 350.

Figure 13:
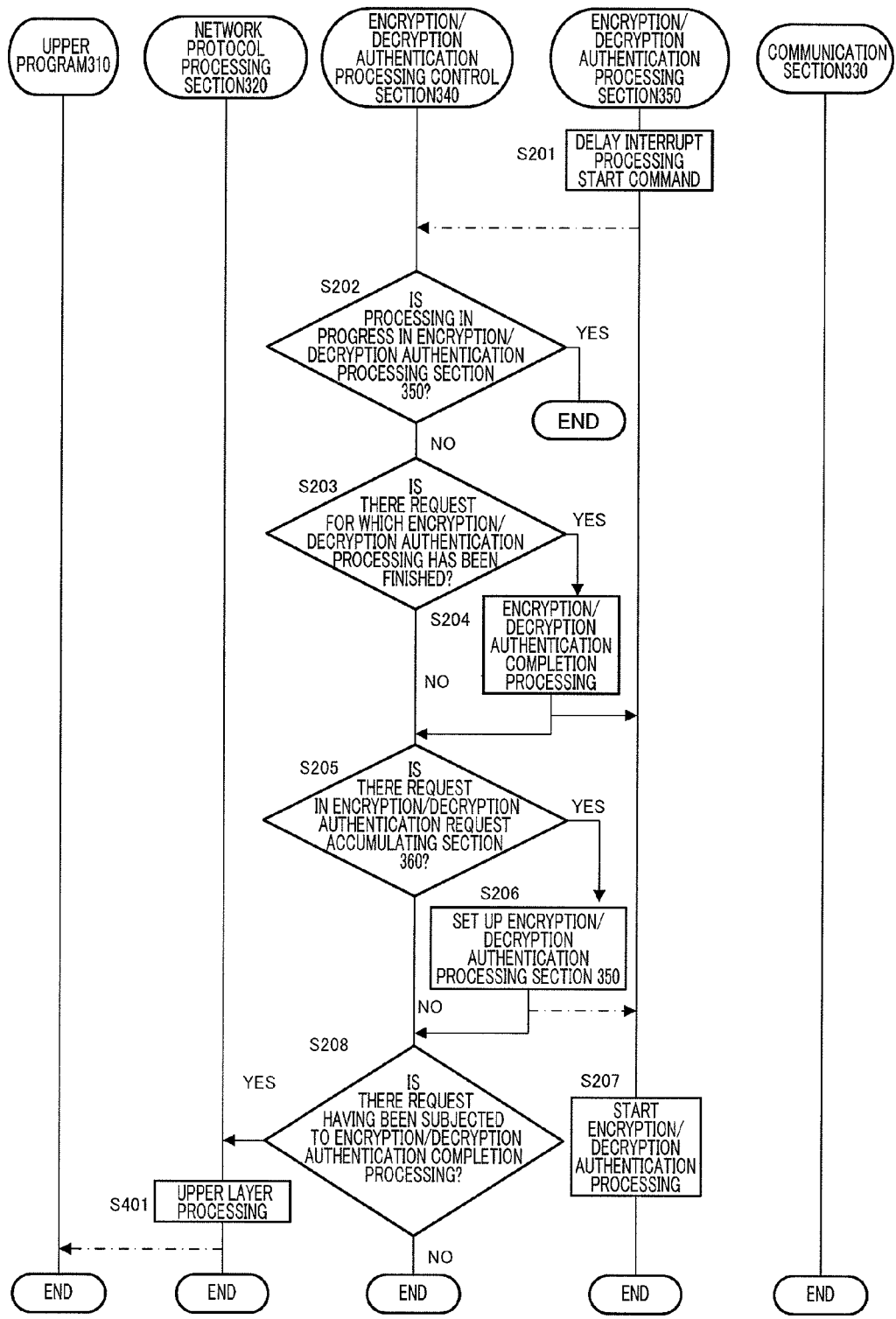
FIG. 13 is a control sequence diagram for explaining the operations upon secure communication processing by a secure communication apparatus according to embodiment 3.

FIG. 13 is a control sequence diagram for explaining the operations upon secure communication processing by secure communication apparatus 300. The steps to perform the same processing as in the flow of FIG. 11 will be assigned the same step numbers and will not be described.

In step S201, encryption/decryption authentication processing section 350 commands encryption/decryption authentication processing control section 340 to start software delay interrupt processing to start the processing of step S202 and later processing.

The processings from step S202 to step S208 are the same as the corresponding processings in FIG. 11.

In step S401, network protocol processing section 320 performs network protocol upper layer processing (including TCP protocol processing, part of IP protocol processing, and so on), and stores a clear text packet having been processed, in a receiving buffer of upper program 310.

Thus, according to the secure communication apparatus according to the present embodiment, the same advantage as by embodiment 2 can be provided, that is, enabling processings up to upper layers in the same context, without disrupting processing by encryption/decryption authentication processing, so that high-speed secure transmission processing can be executed for devices that require particularly high speed such as router and gateway devices and terminals having only less powerful resources such as embedded devices.

The descriptions above only show preferred embodiments of the present invention by way of example and by no means limit the scope of the present invention. For example, although the present invention is applicable to an encrypted information communication system for performing encrypted communication by means of an IPSec protocol via an IPv6 network, as long as an IP network is used, when upper versions with IPv6 network functions are developed, these will also be included.

Each function block, including network protocol processing section 320 and encryption/decryption authentication processing control section 340, may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

Although the terms "secure communication apparatus" and "secure communication method" have been used with the present embodiment for ease of explanation, other terms such as "encrypted information communication apparatus," "encrypted information communication system," "security association methods" and so on may be used as well.

Parts to constitute the above secure communication apparatus, including the types, number and connection method of network protocol processing sections, are by no means limited.

The above-described secure communication method can be implemented as a program for operating the secure communication method. This program may be stored in a computer-readable recording medium.

The disclosure of Japanese Patent Application No. 2008-222554, filed on Aug. 29, 2008, including the specification, drawings and abstract, are incorporated herein by reference in its entirety.

INDUSTRIAL APPLICABILITY

As described above, the secure communication apparatus, secure communication method and program according to the present invention provide an advantage of enabling high speed IPsecure communication processing by software processing or hardware processing, and are therefore suitable for use for a secure communication apparatus and secure communication method.

REFERENCE SIGNS LIST 100, 200, 300 Secure communication apparatus
110 IP secure protocol
120 Crypto manager
130 HW encryption/decryption authentication engine
210 Communication stack section
220 Buffer
230 Encryption authentication processing section
231 Request control section
232 HW pre/post-processing section
233 Queue
240 HW encryption/decryption authentication processing section
310 Upper program
320 Network protocol processing section
330 Communication section
340 Encryption/decryption authentication processing control section
350 Encryption/decryption authentication processing section
360 Encryption/decryption authentication request accumulating section

The invention claimed is:
1. A secure communication apparatus comprising:
a communicator that transmits and receives a communication packet;
a network protocol processor that performs network protocol first half processing and network protocol second half processing for a current packet and a next packet;

an encryption/decryption authentication processor that performs at least one of encryption processing, decryption processing and authentication processing for the current packet and the next packet for which the network protocol first half processing was performed, and the network protocol second half processing was not performed; and an encryption/decryption authentication processing controller that acquires a processing result of the current packet for which one of the encryption processing, the decryption processing and the authentication processing has been finished, and controls the network protocol processor to continuously perform the network protocol second half processing of the packet for which the processing result was acquired, and the network protocol first half processing of a next packet, a layer for which the network protocol first half processing is performed being different from a layer for which the network protocol second half processing is performed.

2. The secure communication apparatus according to claim 1, wherein, when there is a request from the network protocol processor for the encryption processing, the decryption processing or the authentication processing of the next packet for which the network protocol first half processing has been finished, the encryption/decryption authentication processing controller acquires the processing result of the current packet for which the encryption processing, the decryption processing or the authentication processing has been finished in a same central processing unit context shortly before, from the encryption/decryption authentication processor, and controls the network protocol processor to perform the network protocol second half processing of the current packet.

3. The secure communication apparatus according to claim 1, wherein the encryption/decryption authentication processing controller, after having acquired the processing result of the current packet from the encryption/decryption authentication processor, requests the encryption/decryption authentication processor to perform the encryption processing, the decryption processing or the authentication processing of the next packet in a same central processing unit context, before the network protocol second half processing of the current packet is performed in the network protocol processor.

4. The secure communication apparatus according to claim 1, wherein the encryption/decryption authentication processing controller performs encryption/decryption authentication second half processing to acquire the processing result of the current packet by a completion hardware interrupt context or a software delay interrupt context from the encryption/decryption authentication processor, when there is the next packet for which the network protocol first half processing has been finished, the encryption/decryption authentication processing controller performs encryption/decryption authentication first half processing to request the encryption/decryption authentication processor to perform the encryption processing, the decryption processing or the authentication processing of the next packet, and the encryption/decryption authentication processing controller controls the network protocol processor to perform the network protocol second half processing of the current packet.

5. The secure communication apparatus according to claim 4, wherein the encryption/decryption authentication processing controller makes the network protocol processor and the encryption/decryption authentication processor perform parallel processing by reordering processings in an order of: (i) the network protocol first half processing of the next packet; (ii) the encryption/decryption authentication second half processing of the current packet; (iii) the encryption/decryption authentication first half processing of the next packet; and (iv) the network protocol second half processing of the current packet.

6. The secure communication apparatus according to claim 1, further comprising an encryption/decryption authentication request accumulator that, when there are packets for which network protocol first half processing has been finished and network protocol second half processing has not been finished, sets priorities of the packets on a per packet basis, accumulates the priorities as encryption/decryption authentication requests with parameters required for the encryption processing, the decryption processing or the authentication processing, and passes the encryption/decryption authentication requests to the encryption/decryption authentication processor in an order of the priorities of the packets.

7. The secure communication apparatus according to claim 1, wherein the network protocol first half processing comprises lower layer processing, including a portion of internet protocol processing or processing of a layer lower than the internet protocol processing, and the network protocol second half processing comprises upper layer processing, including transmission control processing or a portion of internet protocol processing.

8. A secure communication method comprising:
acquiring packets, including a current packet and a next packet, in a communicator, from a network device or upper layer;
performing network protocol processing, in which network protocol first half processing is performed for the acquired current packet in a network protocol processor;
performing encryption/decryption authentication processing, including at least one of encryption processing, decryption processing and authentication processing, for the current packet for which the network protocol first half processing was performed, and network protocol second half processing was not performed, in an encryption/decryption authentication processor;
performing control, in an encryption/decryption authentication processing controller, to acquire a processing result of the current packet for which the encryption/decryption authentication processing was performed, and, to continuously perform the network protocol second half processing of the current packet for which the processing result was acquired, and the network protocol first half processing of the next packet,
wherein a layer for which the network protocol first half processing is performed is different from a layer for which the network protocol second half processing is performed.

9. The secure communication method according to claim 8, wherein:
in the performing control, when there is a request for the encryption/decryption authentication processing of the next packet for which the network protocol first half processing has been finished, the encryption/decryption authentication processing controller acquires the processing result of the current packet for which the encryption/decryption authentication processing has been finished in a same central processing unit context shortly before; and
in the network protocol processing, the network protocol processor performs the network protocol second half processing of the current packet.

10. The secure communication method according to claim 8, wherein, in the performing control, after the processing result of the current packet is acquired, and before the network protocol second half processing of the current packet is performed in the network protocol processor, the encryption/decryption authentication processing controller requests the encryption/decryption authentication processor to perform the encryption/decryption authentication processing of the next packet in a same processing unit context.

11. The secure communication method according to claim 8, wherein:

in the performing control, the encryption/decryption authentication processing controller performs encryption/decryption authentication second half processing to acquire the processing result of the current packet having been processed, by a completion hardware interrupt context or a software delay interrupt context, from the encryption/decryption authentication processing, and, when there is the next packet for which the network protocol first half processing has been finished, the encryption/decryption authentication processing controller performs encryption/decryption authentication first half processing to request the encryption/decryption authentication processor to perform the encryption/decryption authentication processing of the next packet; and in the network protocol processing, the network protocol processor performs the network protocol second half processing of the current packet.

12. The secure communication method according to claim 11, wherein, in the performing control, processings are reordered in an order of: (i) the network protocol first half processing of the next packet; (ii) the encryption/decryption authentication second half processing of the current packet; (iii) the encryption/decryption authentication first half processing of the next packet; and (iv) the network protocol second half processing of the current packet.

13. The secure communication method according to claim 8, further comprising: in an encryption/decryption authentication request accumulator, setting priorities of packets, for which network protocol first half processing has been finished and network protocol second half processing has not been finished, on a per packet basis, accumulating the priorities as encryption/decryption authentication requests with parameters required for the encryption processing, the decryption processing or the authentication processing, and passing the encryption/decryption authentication requests to the encryption/decryption authentication processing in an order of the priorities of the packets.

14. A non-transitory computer readable medium storing a program configured to make a computer execute the secure communication method according to claim 8.

* * * * *